United States Patent

Koshiba et al.

Patent Number: 5,557,847
Date of Patent: Sep. 24, 1996

[54] METHOD OF PRODUCING A METAL HONEYCOMB CARRIER

[75] Inventors: Yoshikazu Koshiba; Yukio Aoki; Tsuyoshi Minakata; Michio Inamura; Tomohiro Yasunaga, all of Tokyo; Fujiya Imoto, Yawata; Junichi Nakagawa, Takatsuki, all of Japan

[73] Assignee: Nippon Yakin Kogyo Co., Ltd., Tokyo, Japan

[21] Appl. No.: 427,625

[22] Filed: Apr. 21, 1995

Related U.S. Application Data

[63] Continuation of Ser. No. 182,192, filed as PCT/JP93/00725 May 28, 1993, published as WO93/24230 Dec. 9, 1993, abandoned.

[30] Foreign Application Priority Data

| | | | |
|---|---|---|---|
| May 29, 1992 | [JP] | Japan | 4-139314 |
| Jun. 23, 1992 | [JP] | Japan | 4-165010 |
| Jun. 23, 1992 | [JP] | Japan | 4-165020 |

[51] Int. Cl.⁶ .................. B01J 35/04; F01N 3/28
[52] U.S. Cl. .................. 29/890; 29/446; 29/520
[58] Field of Search .................. 428/593, 592, 428/603; 29/890, 446, 520, 447; 228/181; 422/180; 502/439, 527

[56] References Cited

U.S. PATENT DOCUMENTS

| | | | |
|---|---|---|---|
| 4,093,423 | 6/1978 | Neumann | 29/890 |
| 4,347,219 | 8/1982 | Noritake et al. | 29/890 |
| 4,387,497 | 6/1983 | Gulistan | 29/520 |
| 4,413,392 | 11/1983 | Otani et al. | 29/446 |
| 4,637,568 | 1/1987 | Cornelison | 422/180 |
| 4,759,116 | 7/1988 | Jones | 29/446 |
| 4,891,257 | 1/1990 | Humpolik et al. | 428/593 |
| 4,969,265 | 11/1990 | Ehara | 422/180 |
| 4,976,103 | 12/1990 | Takikawa et al. | 422/180 |

FOREIGN PATENT DOCUMENTS

| | | | |
|---|---|---|---|
| 0218062 | 4/1987 | European Pat. Off. . | |
| 0480082 | 4/1992 | European Pat. Off. . | |
| 2591277 | 6/1987 | France . | |
| 3543011 | 6/1987 | Germany | 502/439 |
| 1551917 | 9/1979 | United Kingdom . | |

*Primary Examiner*—John Zimmerman
*Attorney, Agent, or Firm*—Sherman and Shalloway

[57] ABSTRACT

A method for producing a metal catalyst carrier for cleaning automobile exhaust gases is disclosed. A core having a honeycomb cross-section is inserted into an outer cylinder having an inner diameter nearly equal to that of the outer diameter of the core, by expanding one end of the outer cylinder, pressing the core into the expanded cylinder and heating the assembly to restore the shape of the expanded end. Alternatively, the core is formed by winding a foil solder around its periphery and then contracting and inserting the core into the outer cylinder.

6 Claims, 4 Drawing Sheets

5,557,847

METHOD OF PRODUCING A METAL HONEYCOMB CARRIER

This application is a continuation of application Ser. No. 08/182,192, filed as PCT/JP93/00725 May 28, 1993 published as WO93/24230 Dec. 9, 1993, now abandoned.

TECHNICAL FIELD

This invention relates to a metal honeycomb for carrying a catalyst for cleaning automobile exhaust gas and a production method thereof.

BACKGROUND TECHNOLOGY

A method honeycomb carrier for carrying a catalyst for cleaning automobile exhaust gas comprises a core part having a honeycomb cross section obtained by stacking flat steel plates and corrugated steel plates and winding round the stacked plates, and a metallic outer cylinder for containing the core part.

Since a high-temperature exhaust gas of the automobile recirculates in the metal honeycomb carrier, it is necessary that the outer diameter of the core part and the inner diameter of the outer cylinder are nearly equal to each other so that a clearance between both is as small as possible. For this purpose, various methods are used in inserting the core part into the outer cylinder. For example, Japanese Patent Publication 57-55886 discloses a method in which the core part is pressed into the outer cylinder, the diameter of the outer cylinder is reduced by a contracting tool capable of press-fitting the outer cylinder, and the core part and the outer cylinder are welded or soldered to an extent of press-fitting to link one another.

However, with this method, since the core part is difficult to adapt to the outer cylinder, a space tends to be left between the core part an the outer cylinder.

On the other hand, to clean an exhaust gas emitted from an internal combustion engine of automobiles, motorcycles, and the like, a core part comprising a honeycomb structure carrying a catalyst is pressed into an outer cylinder to form a metal honeycomb carrier, which is mounted in a gas cleaning apparatus, and the exhaust gas is passed through the carrier to clean the gas. However, a gas pipe for mounting the honeycomb carrier in the exhaust gas cleaning apparatus is not always circular, but often have elliptical or other specific shapes, and the cross section of the metal honeycomb carrier must be in line with the cross sectional shape of the gas pipe mounting the honeycomb carrier.

For this purpose, there has heretofore been known a method for producing a non-circular metal honeycomb carrier, in which after a circular honeycomb structure is pressed into an outer cylinder, a die is used to press the carrier to an oval or elliptical cross section (Japanese Patent Publication 57-55886).

However, this method has problems in that a deformation occurs in the cell shape between the longer diameter side and the shorter diameter side, and the joining strength is reduced or the cell density is varied, affecting the gas flow distribution.

As another method, a center part having a similar shape to a non-circular outer cylinder and having smaller cross sectional dimensions than the outer cylinder by predetermined values is formed, a flat plate and a corrugated plate are wound around the center part to form a core body, and the core body is pressed into the non-circular outer cylinder (Japanese Patent Laid-open Publication 3-196844).

However, this method has disadvantages in that since the center part is first fabricated, and the corrugated plate and the flat plate are wound round using the center part as a winding shaft into a honeycomb form, the production takes a long time and the productivity is low.

The inventors have conducted intensive studies to improve these problems so that the core part is easily engaged with the outer cylinder to link them securely, achieving the present invention. A primary object of the present invention is to provide a method for producing a metal honeycomb carrier having a good workability. A further object of the present invention is to provide a method for producing a metal honeycomb carrier in which a flat plate and a corrugated plate regularly contact with each other to form a type of ceil structure, without deforming the honeycomb structure.

BRIEF DESCRIPTION OF THE DRAWINGS

FIG. 6 is a schematic view of the winding of flat and corrugated plates around plate-formed winding members separated by a fixed distance to form the non-circular core of the carrier.

DISCLOSURE OF THE INVENTION

Figure 1A:
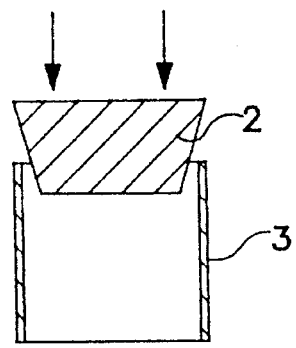
FIGS. 1a–1e are schematic elevation views in cross-section of the steps of insertion of a cylinder expansion die into one end face of an outer cylinder to expand the inner diameter of the end of the cylinder (FIGS. 1a and 1b) followed by insertion of the core into the expanded cylinder (FIGS. 1c and 1d); and resulting product (FIG. 1e).
Figure 1B:
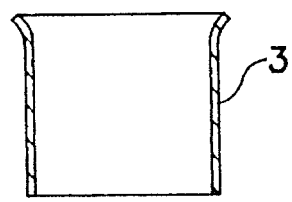
Figure 1C:
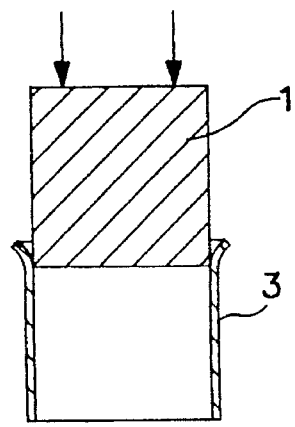
Figure 1D:
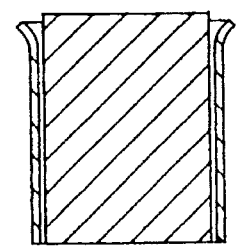
Figure 1E:
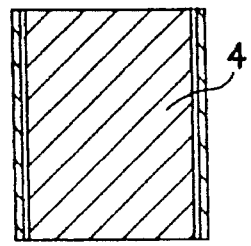

In accordance with the present invention, there is provided in a first embodiment a method for producing a metal honeycomb carrier for carrying an exhaust gas cleaning catalyst comprising the steps of stacking corrugated plates and flat plates in alternation, winding round the stacked plates to form a core part having a honeycomb cross section, and inserting the resulting core part into an outer cylinder having an inner diameter nearly equal to an outer diameter of the core part, characterized in that at least one end of the outer cylinder is expanded and a chip of the core part into the outer cylinder, an end face of the core part is pressed to drive the core part into the outer cylinder, and the assembly is heat treated to contract and restore the expanded end.

That is, in the present invention, the inner diameter of at least one end of the outer cylinder is expanded, at least one end of the core part is inserted into the expanded outer cylinder, the outer end of the core part is pressed, and the assembly is then heat treated to shrink the expanded portion for restoration.

The cylinder expansion in the present invention means that the end of the outer cylinder is expanded to an extent that a chip of the core part can be just inserted into the outer cylinder, and typically an expansion of approximately 0.1 to 0.5 mm from the inner diameter of the outer cylinder is sufficient, for example, using a cylinder expansion die having a trapezoidal cross section as cylinder expansion means, which is inserted into the outer cylinder until a predetermined expansion size is achieved.

After that, the other end of the core part is pressed by an hydraulic cylinder, or by gripping the core part by a robot hand, to press the entire core part into the outer cylinder. When the hydraulic cylinder is used, it is preferable to use a holder plate on the upper portion of the core part in order to prevent the core from being damaged or flawed due to a load concentration.

Furthermore, when the robot hand is used, the core part is gripped by the robot hand and pressed in up to a predetermined position, then the hand is loosened, and the core part is gripped again at a position upper than the inserted portion to be pressed in again by the hand. This procedure is repeated until the entire core part is pressed in.

After the pressing, heat treatment is made to restore the expanded cylinder, at a temperature of 800° to 1,200° C. or 5 hours to 20 minutes. When the core part and the outer cylinder are soldered, heat treatment may be made at about 1,200° C. for 20 minutes under vacuum to achieve restoration and soldering heat treatment.

As another method a second embodiment according to the present invention, there is provided a method for producing a metal honeycomb carrier for carrying an exhaust gas cleaning catalyst comprising the steps of stacking corrugated plates and flat plates in alternation, winding round the stacked plates to form a core part having a honeycomb cross section, winding a foil solder material around its outer periphery as needed to form a core part having a foil solder wound part, and inserting the resulting core part into an outer cylinder having an inner diameter nearly equal to an outer diameter of the core part, characterized in that the core part is contracted by a small diameter part of a split die having a stepped part to a diameter smaller than an inner diameter of the outer cylinder, and the core part is pressed into the outer cylinder to engage the core part with the outer cylinder. There is also provided as a third embodiment according to the present invention a method for producing a metal honeycomb carrier for carrying an exhaust gas cleaning catalyst comprising the steps of stacking corrugated plates and flat plates in alternation, winding round the stacked plates to form a core part having a honeycomb cross section, winding a foil solder material around its outer periphery as needed to form a core part having a foil solder wound part, and inserting the resulting core part into an outer cylinder having an inner diameter nearly equal to an outer diameter of the core part, characterized in that the outer cylinder is held by a receiving tool, the core part is contracted by a die to a diameter smaller than an inner diameter of the output cylinder, and the core part is pressed in an axial direction to drive the core part into the outer cylinder, whereby engaging the cored part with the outer cylinder. There is further provided as a fourth embodiment according to the present invention a method for producing a metal honeycomb carrier for carrying an exhaust gas cleaning catalyst comprising the steps of stacking corrugated plates and flat plates in alternation, winding round the stacked plates to form a core part having a honeycomb cross section, winding a foil solder material around its outer periphery as needed to form a core part having a foil solder wound part, and inserting the resulting core part into an outer cylinder having an inner diameter nearly equal to an outer diameter of the core part, characterized in that the outer cylinder is held by a receiving tool, the core part is held by a core die and its chip is contracted to a diameter smaller than an inner diameter of the output cylinder, pressed into the outer cylinder to the vicinity of the foil solder wound part of the core part, and the core part is pressed into the outer cylinder.

That is, in the second embodiment of the present method, corrugated plates and flat plates are stacked in alternation, the stacked plates are wound round to form a core part having a honeycomb cross section, the chip of the core part or the entire core part is contracted by a small diameter part of a split die having a stepped part to a diameter smaller than an inner diameter of the outer cylinder, the outer cylinder is held by a large diameter portion of the die, the core part is pressed into the outer cylinder, or in the third and fourth embodiments, the outer cylinder is held by a receiving tool, the chip of the core part or the entire core part is pressed by the die to contract the diameter of the core part to a diameter smaller than the inner diameter of the outer cylinder, and then the core part is pressed into the outer cylinder.

To retain the core part and the outer cylinder more securely, a wound part of a foil solder material may be present on the outermost periphery of the core part. Furthermore, the die used is preferably a split die.

In the above-described method, the foil solder material wound part may be present or absent on the outermost periphery of the core part.

However, particularly when the foil solder material wound part is present on the outermost periphery of the core part, the core part is held by the die and its chip is contracted to a diameter smaller than the inner diameter of the outer cylinder, pressed into the outer cylinder to the vicinity of the foil solder wound part of the core part, held by the die in the vicinity of the foil solder wound part and the outer diameter of the core part is contracted to a diameter smaller than the inner diameter of the outer cylinder, and the core part is pressed into the outer cylinder to engage the core part with the outer cylinder, thereby obtaining the metal honeycomb carrier.

In the present invention, the pressing means can be a hydraulic cylinder or the like, which presses the upper portion of the core, or can be a robot hand which is also used as a core die. When the upper portion of the core is pressed, it is preferable to use a holder plate on the upper portion of the core part in order to prevent the core from being damaged or flawed due to a load concentration, and it is also preferable to provide a taper on the inner surface of the core mounting part of the die to facilitate insertion into the outer cylinder.

Furthermore, when the robot hand is used, the core part is gripped by the robot hand and pressed in to the vicinity of a position where the core part is held by the hand, then the hand is loosened, and the core part is gripped again at a position upper than the inserted portion to be pressed in again by the hand. This procedure is repeated until the entire core part is pressed in successively to the soldered portion of the core part. After that, the die is used again to contract the outer diameter of the soldered portion, and the core part is pressed in by the same method.

In these methods, the cross section of the metal honeycomb carrier is not limited to a circular form, by may be a race track form (non-circular) or any other forms as far as a die can be produced.

For a non-circular cross sectional form, there is provided according to the present invention a non-circular metal honeycomb carrier comprising a center part including two rod-formed or plate-formed winding members having splits opposing with a predetermined interval, a core part present on an outer periphery of the center part formed by inserting ends of a flat plate and a corrugated plate into the splits of the winding members and winding round the plates, and an outer cylinder containing the core part. There is also provided according to the present invention a method for producing a non-circular metal honeycomb carrier comprising the steps of placing two rod-formed or plate-formed winding members having splits, inserting ends of a flat plate and a corrugated plate to be wound into the splits, winding the flat plate and the corrugated plate around the winding members by rotating the winding members to form a non-circular metal honeycomb structure, and encasing the non-circular metal honeycomb carrier into a non-circular outer cylinder having the same shape, or, holding the winding members, winding the flat plate and the corrugated plate around the winding members to form a non-circular metal honeycomb structure, and encasing the non-circular metal honeycomb carrier into a non-circular outer cylinder having the same shape. After the non-circular metal honeycomb structure is formed, the winding members may be removed.

In the present invention, since a desired honeycomb cross sectional shape can be obtained by varying the interval of the two rod-formed or plate-formed members used as a winding member, and a honeycomb body having a similar shape to a non-circular outer cylinder can be obtained simply by winding the flat plate and the corrugated plate around two shafts, it is unnecessary to process the once-formed honeycomb body to a non-circular shape as in the prior art, and the flat plate and the corrugated plate will not make an irregular contact. Furthermore, since is is also unnecessary to form a center part previously which is wound by the plates, a core part comprising a regularly-formed honeycomb structure can be obtained.

The winding member used in the present invention preferably has a split pin form so that the ends or side edges of the flat plate and the corrugated plate can be retained, and the ends of the flat plate and the corrugated plate are inserted and retained into the splits of the shaft. The rod-formed or plate-formed winding members may be rotated about their center to wind the flat plate and the corrugated plate, or the winding members may be held and wound round by the flat plate and the corrugate plate while stacking the plates.

The present invention will now be described with reference to the drawings.

FIG. 1 is a schematic view for explaining the first embodiment of the present invention.

Figure 2A:
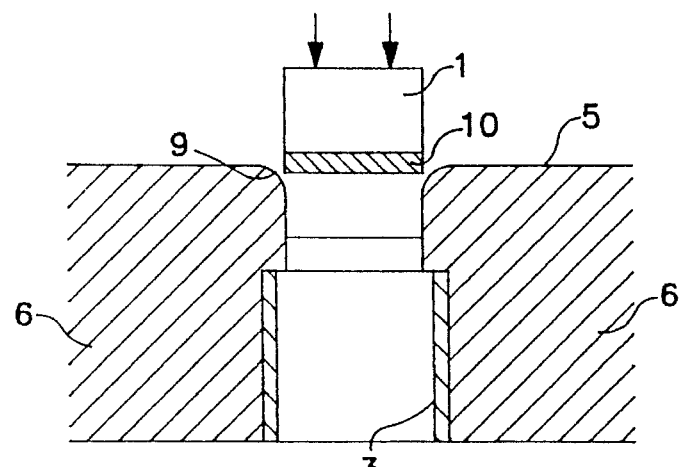
FIG. 2 is a schematic side elevation sectional view illustrating the steps of forming a metal carrier by pressing a die into the outer cylinder to expand the outer cylinder (FIG. 2a) and pressing the core into the outer cylinder (FIG. 2b).
Figure 2B:
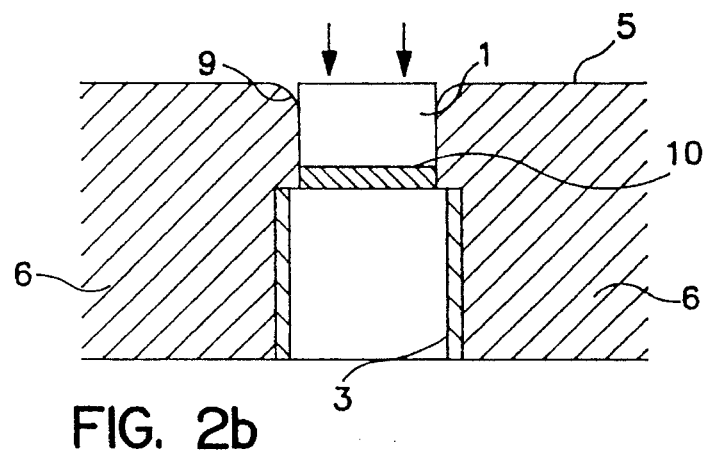
Figure 3:
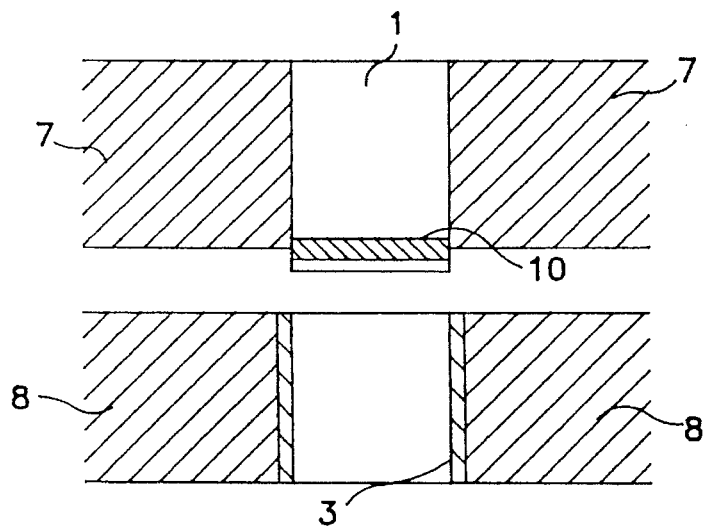
FIG. 3 is a schematic view of a method of forming a metal carrier wherein the core is provided with a solder material on its periphery which protrudes from the end face of a die into which the core is placed to contract the core prior to the insertion into the outer cylinder.

FIGS. 2(a) and 2(b) are schematic views for explaining the second embodiment of the present invention, and FIG. 3 is a schematic view for explaining the third and fourth embodiments of the present invention.

In the present invention, corrugated plates and flat plates are stacked in alternation to form the core part 1. When the resulting core part 1 is pressed into the outer cylinder 3, 2-part pressing stepped dies 6 and 6 having a stepped part 5 as shown in FIG. 2 are used. The outer cylinder 3 is held by a large diameter part of the pressing stepped dies 6 and 6, and the core part 1 is held by a small diameter part, and a pressure is applied by the dies 6 and 6 to the core part 1 to contract it. The pressure applied is about 3 kgf/cm$^2$. This reduces the diameter of the core part 1 by about 3%, and the core part and the outer cylinder 3 are shaped to round forms.

Then, a pressure is applied uniformly by a hydraulic cylinder from the upper part of the core part 1 to press the core part 1 into the outer cylinder 3. This condition is shown in FIG. 2(b). In this case, it is preferable to use a holder plate on the upper portion of the core part 1 in order to prevent the core from being damaged or flawed due to a load concentration, and it is also preferably to provide a taper 9 on the inner surface of the core mounting part of the die to facilitate insertion into the outer cylinder.

Referring to FIG. 3, the pressing die is 2-part split dies which comprise a core die 7 and an outer cylinder die 8. Corrugated plates and flat plates are stacked in alternation to form the core part 1, and the resulting core part 1 is wound round on the outermost periphery with a foil solder material 2. The core part 1 is held by the core dies 7 and 7, and the outer cylinder is held by a receiving tool, for example, the outer cylinder dies 8 and 8. The core dies may be replaced with a robot hand. The core dies 7 and 7 held with the core part 1 are placed to engage with the outer cylinder 3. The outer diameter of the core part 1 is contracted by the core dies to be smaller than the inner diameter of the outer cylinder, and pressed into the outer cylinder. The pressing means is as described above.

Figure 4:
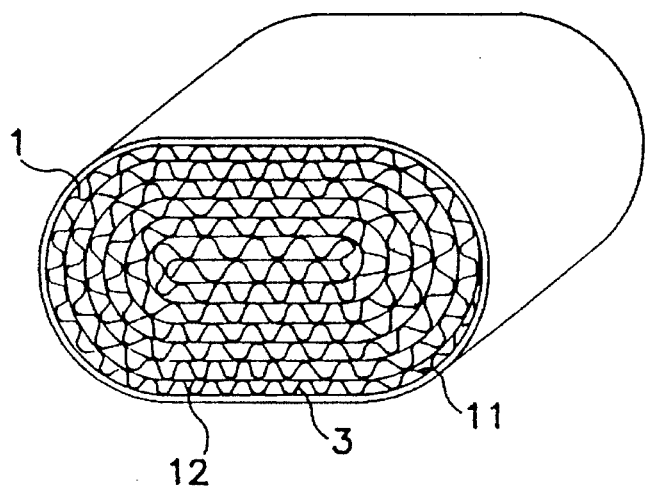
FIG. 4 is a schematic view of the non-circular metal honeycomb carrier.
Figure 5A:
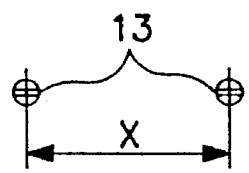
FIG. 5 is a schematic view of the method of producing the non-circular carrier through the use of two split winding shafts which are separated by a fixed distance (FIG. 5a) and to which splits the flat and corrugated plates are attached (FIG. 5b) and wrapped around to form the carrier (FIGS. 5c, 5d).
Figure 5B:
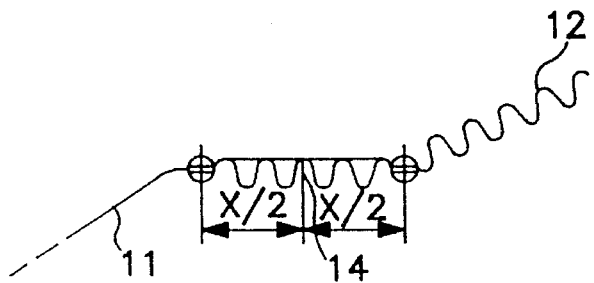
Figure 5C:
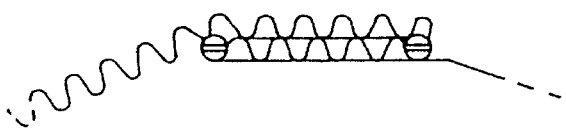
Figure 5D:
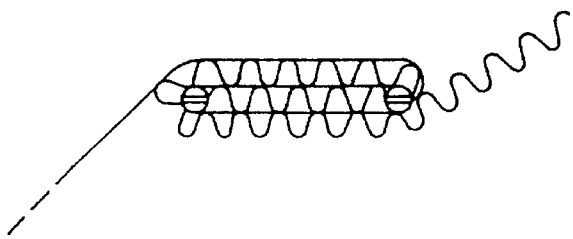

FIG. 4 is a schematic perspective view of the non-circular metal honeycomb carrier of the present invention. Referring to FIG. 4, a flat plate 11 and a corrugated plate 12 are formed by winding in alternation, and then encased in a non-circular outer cylinder 3.

FIG. 5 is a schematic view for explaining the production method of the non-circular metal honeycomb. First, two split pin-formed winding shafts 13 and 13 as rod-formed winding members are disposed in parallel at an interval X to coincide with the shape of a honeycomb carrier to be formed (a). Then, ends of the flat plate 11 and the corrugated plate 12 are individually inserted into splits of the individual winding shafts 13 and 13(b). While maintaining the interval between the winding shafts 13 and 13, the winding shafts 13 and 13 are rotated about a winding center axis 14 provided at the center of the winding shafts to stack and wind the flat plate and the corrugated plate (c), (d).

In another embodiment of the production method according to the present invention, two rod-formed winding members 13 and 13 having splits as rod-formed winding members are disposed and retained in parallel at an interval X to coincide with the shape of the honeycomb carrier to be formed. The flat plate and the corrugated plate are wound around the winding members while stacking the plates.

Figure 6A:
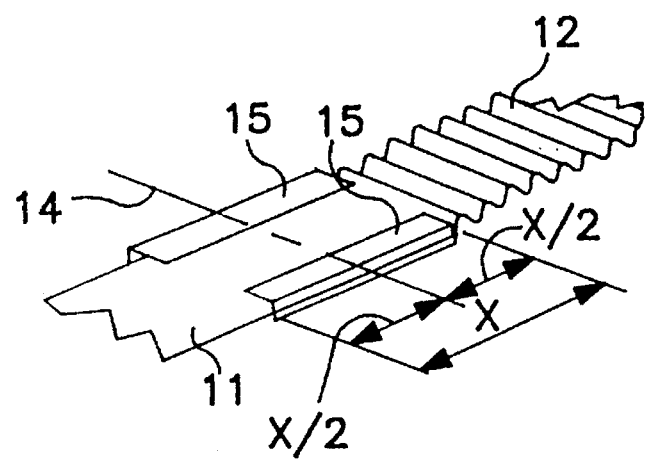
In FIG. 6a, the flat and corrugated plates are inserted into splits in each of the winding plates.
Figure 6B:
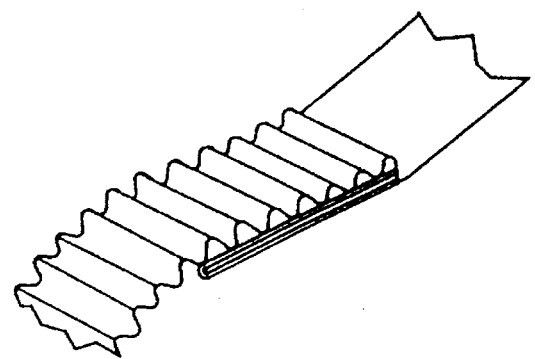
In FIG. 6b, the plates are wound around the winding members to form a core.

FIG. 6 is a schematic view for explaining a case where plate-formed members are used as the winding members. Referring to FIG. 6, the winding members comprising plate-formed members 15 and 15 have a length X according to the shape of a honeycomb body 1, and side edges of the flat plate and the corrugated plate are inserted into the splits of the winding members to be retained (a). Then, the flat plate 11 and the corrugated plate 12, while being stacked, are wound around the winding members to form a core body (b).

In the present invention, the non-circular honeycomb structure 1 is formed of the flat plate 11 and the corrugated plate 12 using the above method to form a core part, which is pressed into the outer cylinder 3 having the same shape as the core part.

BEST MODE FOR PRACTICING THE INVENTION

The present invention will be described further in detail with reference to the embodiments.

Example 1

Referring to FIG. 1, a cylinder expansion die 2 is inserted by about 1 to 2 mm into one end face of an outer cylinder 3(a) to expand the inner diameter of the end portion of the outer cylinder 3 end by 0.1 to 0.2 mm. The expanded cylinder end is shown in b. Then, a core part 1 is inserted into the expanded outer cylinder 3, a pressure is applied from the other end face of the core part to press the core part into the outer cylinder 3(d), the assembly is heat treated at about 900° C. for 60 minutes to restore the expanded portion, thereby obtaining a metal honeycomb carrier 4.

Example 2

Corrugated plates and flat plates comprising 0.05-mm thick stainless steel foils were stacked, and the stacked foils were wound round to form a core part with an outer diameter of 150 mm having a honeycomb cross section. The resulting core part was set in a pressing stepped die shown in FIG. 2(a), the die was pressed in the axial direction at a pressure of 3 kgf/cm$^2$ to contact the core diameter to 149.5 mm. The core was then pressed from the upper portion with a uniform pressure of about 5 kgf/cm$^2$ into an outer cylinder. This condition is shown in FIG. 2(b). In this case, it is preferable to use a holder plate in order to prevent the core part from being damaged or flawed due to a concentration of load.

Example 3

Corrugated plates comprising 0.05-mm thick stainless steel foils and flat plates of the same thickness were stacked, the stacked foils were wound round to form a core part with an outer diameter of 150 mm having a honeycomb cross section, and a foil solder material was wound round the core part at its axial center, so that a flat plate comes at the outermost periphery and the solder material is present at an end face of its outermost periphery. The solder material at this moment had a thickness of 25 μm and a width of 15 mm.

The resulting core part was contracted in the direction of the core part center using the pressing device shown in FIG. 2(a) as in Example 2. This reduced the core diameter by 0.2 to 0.5 mm, and the core was pressed into an outer cylinder as in Example 1. This condition is shown in FIG. 2(b).

Example 4

Corrugated plates comprising 0.05-mm thick stainless steel foils and flat plates of the same thickness were stacked, the stacked foils were wound round to form a core part with an outer diameter of 150 mm having a honeycomb cross section, and a foil solder material was wound round the core part at its axial center, so that a corrugated plate comes at the outermost periphery and the solder material is present at its outermost periphery. The solder material at this moment had a thickness of 25 μm and a width of 15 mm.

The resulting core part was contracted in the direction of the core part center using the pressing device shown in FIG. 2(a) as in Example 2. This reduced the core diameter of 0.2 to 0.5 mm. A looseness is generated at the core diameter reduction, however, since the looseness goes to the valley side of the corrugated plate and is inserted into the outer cylinder, the solder material present on the outer periphery of the corrugated plate at the outermost periphery will not be damaged or shifted.

The resulting core was pressed into the outer cylinder as in Example 1. This condition is shown in FIG. 2(b).

Example 5

Corrugated plates comprising 0.05-mm thick stainless steel foils and flat plates of the same thickness were stacked, the stacked foils were wound round to form a core part with an outer diameter of 150 mm having a honeycomb cross section, and a foil section material was wound round the core part at its axial center, so that a flat plate comes at the outermost periphery and the solder material is present at an end face of its outermost periphery. The solder material at this moment had a thickness of 25 μm and a width of 15 mm.

The resulting core part was set in a die having a taper so that the solder material protrudes by about 1 mm from the end face of the die as shown in FIG. 2(a), the core part was contracted by a pressure of 6 to 10 kgf/cm$^2$ to contract the outer diameter of the core part to 149.5 mm, 1.5 mm smaller than the diameter of the outer cylinder.

On the other hand, the outer cylinder was set in the die and held at a pressure of 3 kgf/cm$^2$, the above core part was inserted into the outer cylinder, and a pressure of 6 to 10 kgf/cm$^2$ was applied to the core die to press the core into the outer cylinder. This condition is shown in FIG. 2(b).

Example 6

Corrugated plates comprising 0.05-mm thick stainless steel foils and flat plates of the same thickness were stacked, the stacked foils were wound round to form a core part with an outer diameter of 150 mm having a honeycomb cross section, and a foil solder material was wound round the core part at its axial center, so that a flat plate comes at the outermost periphery and the solder material is present at its outer periphery. The solder material at this moment had a thickness of 25 μm and a width of 15 mm.

The resulting core part was set in a core die as shown in FIG. 3 so that the solder material protrudes by about 1mm from the end face of the die, the core part was contracted by a pressure of 6 to 10 kgf/cm$^2$ to reduce the outer diameter of the core part to 149.5 mm, 1.5 mm smaller than the diameter of the outer cylinder. On the other hand, the outer cylinder was set in the outer cylinder die and held at a pressure of 3 kgf/cm$^2$, the chip of the above core part was inserted into the outer cylinder, a pressure of 6 to 10 kgf/cm$^2$ was applied to the core die to press the core into the outer cylinder, the core die was then shifted upward, the core part was again held, and a pressure was applied to successively press the core part into the outer cylinder. As a result, the core was pressed into the outer cylinder without peeling or breaking the solder material.

UTILIZABILITY IN INDUSTRY

As described above, in the present invention, since one end face of the outer cylinder is expanded, for example, using a cylinder expansion die, the core part can be easily inserted, and, when the outer cylinder and the core part are soldered, the restoration step can be carried out simultaneously, thereby producing a uniform, high-quality metal honeycomb carrier.

In particular, when the metal honeycomb has a non-circular cross section, the winding members comprising two rod-formed or plate-formed members are used as a center part, which is wound by the flat plate and the corrugated plate while stacking them, the resulting metal honeycomb carrier is integrally structure from its center to the outer periphery. Therefore, since it is unnecessary to form a metal carrier and then process as in the prior art, the joining strength and the gas flow distribution are not affected, and since it is unnecessary to specifically process the center part, processing steps can be reduced providing improved economy.

We claim:

1. In a method for producing a metal honeycomb carrier for carrying an exhaust gas cleaning catalyst, wherein the carrier is in the form of a core part having a honeycomb structure formed by winding a plurality of alternating corrugated metal plates and flat metal plates, by inserting the core part into an outer cylindrical casing having an inner diameter substantially the same as the outer diameter of the core part, the improvement comprising contracting the core part to an outer diameter which is smaller than the inner diameter of the cylindrical casing, inserting the contracted core part into the cylindrical casing, and, allowing the inserted contracted core part to expand to its original outer diameter to thereby engage with the cylindrical casing, said step of contracting the core part thereby facilitating the step of inserting the core part into the cylindrical casing.

2. A method according to claim 1 wherein the step of contracting the core part comprises contracting the core part in the smaller diameter portion of a split die, and the step of inserting comprises holding the cylindrical casing by the larger diameter portion of the split die and pressing the contracted core part from the smaller diameter portion of the split die into the cylindrical casing.

3. A method according to claim 2, which further comprises, prior to the contracting step, winding a foil solder material around the outer periphery of the core part to form a core part having a foil solder wound portion, contracting the core part with foil solder wound portion to a diameter smaller than the inner diameter of the cylindrical casing, and pressing the contracted core part with foil solder wound portion into the cylindrical casing to engage the core part with foil solder material with the cylindrical casing.

4. A method according to claim 1 wherein the step of contracting comprises contracting the core part with a die to form a contracted core part having a diameter smaller than the inner diameter of the cylindrical casing, and wherein the step of inserting comprises holding the cylindrical casing with a receiving tool and pressing the contracted core part in an axial direction to drive the contracted core part into the outer cylinder; and, thereafter, allowing the inserted contracted core part to expand to its original diameter to engage the cylindrical casing.

5. A method according to claim 4 which further comprises, prior to the contracting step, winding a foil solder material around the outer periphery of the core part to form a core part having a foil solder wound portion, contracting the core part with foil solder wound portion to a diameter smaller than the inner diameter of the cylindrical casing, and pressing the contracted core part with foil solder wound portion into the cylindrical casing to engage the core part with foil solder material with the cylindrical casing.

6. The method of preparing a metal honeycomb carrier according to claim 1, wherein the improvement comprises winding a foil solder material around the outer periphery of the core part at an end thereof, holding the outer cylindrical casing against axial movement, contracting the end of the core part having the foil solder material wound thereon, to a diameter smaller than that of the inner diameter of the cylindrical casing, inserting the contracted end face of the core part into the cylindrical casing such that the foil solder material is within the casing and contracting the remaining portion of the core part to a diameter smaller than that of the inner diameter of the casing, inserting the contracted core part into the case and, allowing the contracted core part to expand to its original diameter to thereby engage with the inner diameter of the cylindrical casing.

* * * * *